J. B. SMITH.
Hand Plow.
No. 1,117.
Patented Apr. 10, 1839.
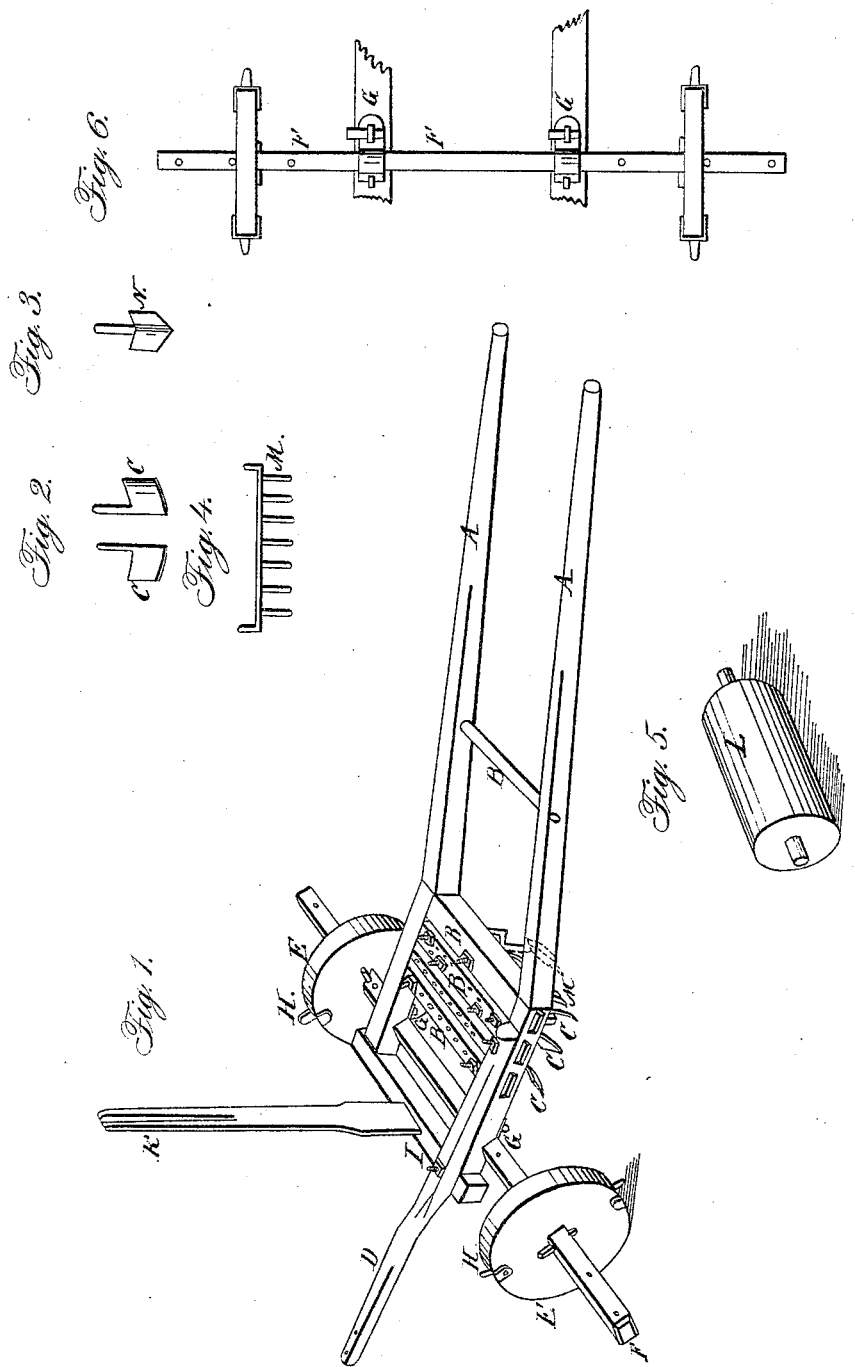

UNITED STATES PATENT OFFICE.

JNO. B. SMITH, OF PRINCESS ANNE COUNTY, VIRGINIA.

IMPROVEMENT IN GARDEN-CULTIVATORS.

Specification forming part of Letters Patent No. 1,117, dated April 7, 1839; antedated October 10, 1838.

*To all whom it may concern:*

Be it known that I, JOHN BOUSH SMITH, of Princess Anne county, State of Virginia, have invented a new and useful Improvement in Garden-Cultivators, which is described as follows, reference being had to the annexed drawings of the same, making part of this specification.

Figure 1 is a perspective view of the cultivator; Fig. 2, right and left plows for cultivating corn and pease; Fig. 3, double moldboard for opening furrows for pease, &c.; Fig. 4, rake; Fig. 5, roller; Fig. 6, hinged boxes embracing the shaft F.

This cultivator consists of two longitudinal parallel shafts, A A, Fig. 1, made straight three-fourths of their length, and turned upward the other fourth, united together by four or five transverse timbers, B B B B, having tenons on their ends entering mortises in the shafts, by which they are held firmly together. In those of the transverse timbers are made rows of vertical holes extending through them to admit the standards of iron plows, or the shanks of teeth or cultivators C of various descriptions, suitable for operating in the various kinds of soil, having shoulders formed on said shanks fitting close against the under side of said transverse timbers, and screws cut on the upper ends of the shanks, on which are screwed nuts or taps turned down upon the upper sides of said cross-timbers for drawing said shoulders of the shanks close up to their proper places. These several rows of holes are for the purpose of enabling the farmer to shift the position of the plows or teeth to change the cultivators to suit the soil to be worked or the plants to be cultivated; and the long parallel shafts are to be laid hold of by the farmer, by which he guides and propels the machine by his own power without the aid of horses, although animal power may be applied by fixing a tongue, D, to the forward end of one of the shafts or in the center, to which the animal is to be geared for drawing the machine forward.

The part of the machine just described is to be supported on the revolving wheels E, placed on a square shaft, F, passing through the center thereof, whose journals, which are made round and formed between said wheels, turn in hinged boxes G, placed on the under sides of the shafts, near the forward ends thereof. The hinge of each box is at one end, and at the other end there is a mortise which admits a staple to pass through in closing the hinged box around the journal of the wheel-shaft, and close to the under side of the shaft, and through which staple is inserted a key which secures the box. The boxes are thus hinged in order to allow of the shaft being removed with facility when its place is to be supplied by a longer or shorter one. The shaft is perforated with a number of holes to receive pins for the purpose of holding the wheels at any desired width apart on said shaft. On the periphery of each wheel is placed one or more teeth, H, for the purpose of marking the ground where corn is to be planted as the wheels revolve. These teeth may be secured to the wheels by means of flanges embracing the sides of the wheel, through which pins are inserted, or in any other mode.

At the ends of the shafts is placed a cross-timber, I, containing mortises which admit tenons on the ends of the shafts by which they are united, and in which timber is placed an upright sighting-staff, K, slit at the upper end for the farmer to sight through in marking the rows for planting the grain. This cross-timber and sight-staff may be removed in working the plants; and in planting small seed the plow's shaft and wheels must also be removed and a roller, L, Fig. 5, put between the shafts, with the journals in the hinged boxes for pulverizing the earth or rolling in the seed.

A rake, M, Fig. 4, may also be placed in one of the cross-timbers behind the roller for pulverizing the land and for covering the seed, in which position the rake may be used in the backward as well as forward movement of the cultivator.

To use this machine for laying off the rows for planting corn, all the iron plows, cultivators, and rakes must be removed and the sighting-staff put in its proper place in the center of the front cross-timber, and the wheels being adjusted on the shaft to the width apart that it is designed to plant the corn, and the teeth on the periphery thereof arranged according to the distance it is designed to plant the corn, the farmer takes hold of the handles, looks through the slit of the sight-staff, keeping his eye on an object fixed at the side of the field between the intended rows, and pushes the machine before him. The revolving of the wheels over the ground causes the teeth on the periphery thereof to mark the ground where it is intended to plant the corn. When he arrives at the ends of the intended rows he turns the machine around and moves it to the right or left the distance required of the rows apart and returns in the same manner, and thus the field is laid off into straight rows of uniform widths apart. The corn is dropped in the usual manner by hand. To cover it the sight-staff is removed and two plows are fixed to the middle cross-beam with mold-boards turned toward the row of corn, so as to cover it as the machine is drawn or pushed forward by hand or horse power. When the corn is up at a sufficient height it is worked by the same machine, either throwing the earth toward or from the rows, as desired, by arranging the plows accordingly.

To plant garden-pease, a small double mold-board, N, Fig. 3, must be fixed to the center of one of the cross-beams for opening a furrow to receive the pease. After the pease are sown, which is done by hand, they are covered in the same manner as the corn.

For preparing ground for receiving plants or roots, round sharp teeth must be fixed at a proper distance apart on the periphery of each wheel for making the holes to receive the plants, which is done by the revolution of the wheels as the machine is pushed forward.

In planting the several kinds of seeds and plants, teeth and plows suitable for the purpose must be arranged in the holes of the cross-timbers, and suitable teeth and pins fixed on the peripheries of the wheels adapted to perform the object intended.

When it is desired to plant corn in squares of five or six feet the teeth on the wheels may be dispensed with, and a weight put on the machine to cause the wheels to sink into the earth. In marking off the ground for this kind of planting, the rows must be marked in parallel lines in one direction, and then crossed at right angles the same distance apart, which will form the squares.

The length of the shaft, diameter of wheels, and number of teeth on the peripheries of the wheels are determined by the kind of planting to be performed.

The invention claimed and desired to be secured by Letters Patent consists—

In the mode of directing the course of the machine by means of the sighting-staff, combined with the machine in the manner described, and also in the mode of adjusting the machine for different widths by shifting the wheels on the perforated shaft, as herein described.

JNO. B. SMITH.

Witnesses:
WM. P. ELLIOT,
WM. BISHOP.